Aug. 17, 1937. V. W. KLIESRATH 2,090,207
CONTROL
Original Filed Jan. 21, 1933
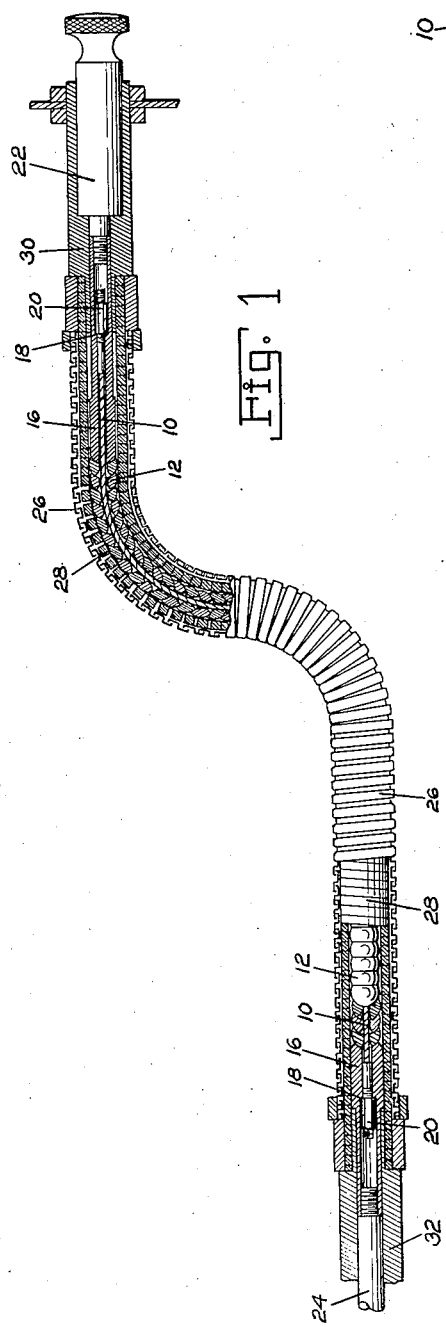
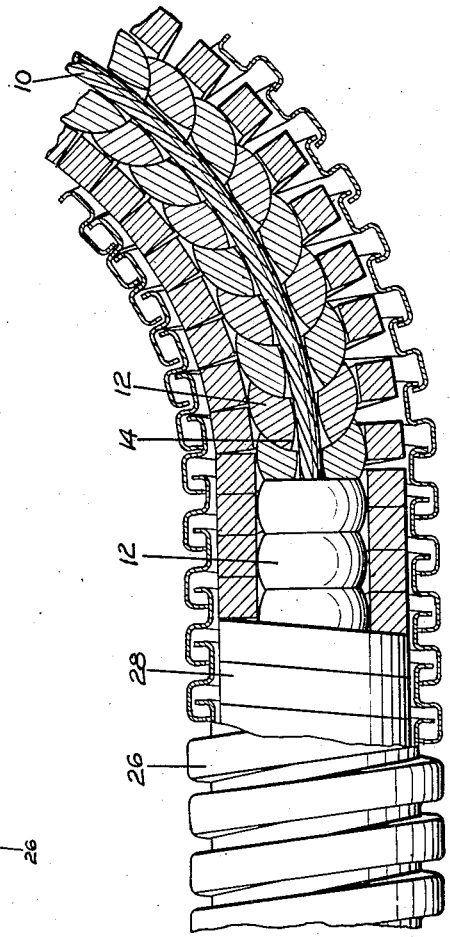
INVENTOR.
VICTOR W. KLIESRATH
BY
ATTORNEY.

Patented Aug. 17, 1937

2,090,207

UNITED STATES PATENT OFFICE 2,090,207

CONTROL

Victor W. Kliesrath, South Bend, Ind., assignor to The Steel Wheel Corporation, Chicago, Ill., a corporation of New York

Original application January 21, 1933, Serial No. 652,953. Divided and this application January 23, 1935, Serial No. 3,035

6 Claims. (Cl. 74—502)

This invention relates to push and pull actuators particularly of the Bowden cable type. An object of the invention is to provide a simple push-pull actuator which is positive in its action in both directions regardless of the angle through which it operates and which is particularly adapted to transmit both tension and compressive forces in a positive manner between two relatively moving parts.

The push-pull actuator of this invention is particularly adapted for use in connection with the driving mechanism described and claimed in my application Serial No. 652,953, filed Jan. 21, 1933, of which this application is a division. It will, however, be apparent that the same is also of general application and can be used wherever it is desired to apply a compressive and/or tension force.

In one desirable arrangement the invention is embodied in a push-pull actuator in which a plurality of compression elements are threaded on a tension cable. Each of the elements preferably has a spherical concave face on one side and a spherical convex face on the other side, the elements interfitting when assembled in a series to be connected by a series of ball and socket joints. Thus free angular movement in any direction is made possible.

Each compression element is also provided with a central hole through which the cable is threaded and the cable is secured to the end members of the series of compression elements to provide a unitary assembly.

Due to the ball and socket interfitting joints of the compression elements the total length of the passage formed by the holes therethrough remains constant regardless of the angularity of the actuator and the over-all outside length of the series of compression elements is also constant. This is a very important feature since it eliminates any tendency to stretch the cable and also provides a positive control in both directions without any lost motion.

Each end of the tension cable is preferably connected to an abutment member formed with a spherical concave or convex face to interfit with the adjacent compressive element. The abutment members are bored to form, in effect, a sleeve and the cable extends through the bore, there being a nut on the cable engaging a shoulder in the bore adjustably to secure the cable to the sleeve. A suitable control member is connected to one abutment member and the other is connected to any desired element to be controlled.

The assembly of the cable and compression elements is slidably received in a suitable conduit, preferably flexible. One end of this conduit may be secured adjacent the control and the other adjacent the part to be controlled.

Other objects, advantages and novel features of the invention will be apparent from the following detailed description when taken in connection with the accompanying drawing showing one embodiment thereof. It is to be understood, however, that the drawing is for the purpose of illustration only and is not to be taken as a definition of the limits of the invention.

In the drawing:

Fig. 1 is a view with parts in section and parts in elevation showing one embodiment of the invention, and Fig. 2 is an enlarged partial sectional view of the construction shown in Fig. 1.

Referring to the drawing, in detail there is shown a push-pull actuator embodying the present invention and constituted by a flexible tension cable 10 having threaded thereon a series of compression elements 12. As shown, these compression elements are parti-spherical and have a portion of one side cut away to form a concave spherical socket into which a convex spherical portion of an adjacent element is adapted to slidably fit. Thus the elements are connected by a series of ball and socket joints so that they can be angularly moved in any direction and the over-all length of the series will remain constant.

Each compression element is bored and when they are assembled the bores form a passageways through which the cable is threaded. As best seen in Fig. 2, the edges of these passageways are beveled as at 14 to provide suitable clearance for the cable upon bending, but the cable has a relatively close fit at the central portion of the bores.

In order to secure the compression members on the cable suitable abutment or end members 16 are secured to the opposite ends thereof in abutting engagement with the compression elements. One of these end members has a concave spherical end for forming a ball and socket joint with the convex side of the adjacent compression element and the other a convex spherical end to form a similar joint with the concave side of its adjacent spherical element.

The end members 16 are bored with bores of two different sizes to form a shoulder 18 intermediate the ends thereof and the cable is extended into the bore. Preferably the end of the cable is screw threaded or it is provided with a screw threaded extension onto which is screwed a nut 20 engaging the shoulder 18 to hold the cable in the sleeve. By this means the cable is firmly held and can be adjusted to the desired tension.

The sleeve 16 on one end may be connected as by screw threads to any desired operating or control member 22 for pushing and/or pulling the same and this operating member may be connected to or form a part of any desired lever or plunger mechanism. The sleeve 16 at the other end may be connected to any desired mechanism to be operated or controlled, such as the rod 24, which may be connected to or form a part of some mechanism such as the gear device shown in the prior application referred to above.

The assembly of cable and compression elements is slidably mounted in any suitable conduit which is preferably flexible. As shown, this conduit is constituted by two concentric spirally wound members 26 and 28, the inner one of which presents a smooth inner surface to facilitate sliding of the cable and compression element assembly. The ends of the conduit are secured to members 30 and 32 which may be secured to or form part of suitable supports fixed adjacent the control mechanism and mechanism to be controlled respectively.

Thus there is provided by the present invention a push-pull actuator which is positive in its action in both directions, which has no lost motion in either direction and which is substantially unaffected by changes in angularity. While only one embodiment of the invention has been shown and described, it will be apparent that various changes might be made therein without departing from the scope of the invention and it is not intended that the scope of the invention shall be limited to the form shown or otherwise than by the terms of the appended claims.

What is claimed is:

1. A push and pull actuator including a flexible cable having threaded thereon a series of ball-and-socket jointed compression elements each of said elements having opposed concave and convex surfaces of equal radii, the distance between said surfaces being less than the diameter of the element, and a flexible conduit receiving said cable and elements, and in which the assembly of said elements and cable is slidable as a unit.

2. A push and pull actuator comprising a flexible tension member, a series of compression elements on said member each having its opposed faces substantially spherically convex and spherically concave respectively whereby the length of the series is constant regardless of its angularity and a conduit slidably receiving the member and elements.

3. In a push-pull actuator a series of ball and socket jointed compression elements each having a perforation therethrough, said perforations being enlarged adjacent the surfaces of the element forming in effect an elongated passageway of constant length regardless of its angularity and a tension member extending through said passageway and connecting the end elements of said series.

4. In a push-pull actuator a series of ball and socket jointed compression elements each having a perforation therethrough, said perforations being enlarged adjacent the surfaces of the element forming in effect an elongated passageway of constant length regardless of its angularity and a cable of constant length extending through said passageway and connecting the end members of the series.

5. In a push and pull actuator, a flexible cable having threaded thereon a series of ball and socket jointed compression elements, each of said elements having opposed concave and convex surfaces of equal radii, the maximum distance between said surfaces being substantially equal to said radii.

6. In a push and pull actuator, a flexible cable having threaded thereon a series of ball and socket jointed compression elements, each of said elements having opposed concave and convex surfaces of equal radii, the maximum distance between said surfaces being substantially equal to said radii, and each of said elements having an opening between said surfaces through which the cable extends, said opening being of substantially the same diameter as the cable adjacent its center and increasing in diameter adjacent its ends.

VICTOR W. KLIESRATH.